United States Patent [19]

Takahashi

[11] Patent Number: 4,602,313
[45] Date of Patent: Jul. 22, 1986

[54] CONTROL CENTER WITH VERTICAL CONTROL BUS DEVICE

[75] Inventor: Masaru Takahashi, Gifu, Japan

[73] Assignee: Mitsubishi Denki Kabushiki Kaisha, Tokyo, Japan

[21] Appl. No.: 611,142

[22] Filed: May 17, 1984

[30] Foreign Application Priority Data

May 31, 1983 [JP] Japan ................................. 58-96261
May 31, 1983 [JP] Japan ................................. 58-96262

[51] Int. Cl.⁴ .......................................... H02B 13/02
[52] U.S. Cl. .................................. 361/342; 361/341; 361/361; 361/391
[58] Field of Search ............................ 174/68 B, 70 B; 339/22 B; 361/334, 341, 342, 355, 361, 378, 372, 426, 390, 391, 429

[56] References Cited

U.S. PATENT DOCUMENTS

| | | | |
|---|---|---|---|
| 2,542,853 | 2/1951 | Wills | 361/334 |
| 2,648,032 | 8/1953 | Mekelburg | 361/341 |
| 3,924,161 | 12/1975 | Olashaw et al. | 361/341 |
| 4,074,092 | 2/1978 | Csenky | 339/22 B |
| 4,180,845 | 12/1979 | Shariff et al. | 361/334 |
| 4,305,114 | 12/1981 | Takagi et al. | 361/334 |
| 4,502,097 | 2/1985 | Takahashi | 361/391 |

FOREIGN PATENT DOCUMENTS

1441344  6/1976  United Kingdom ................ 361/334

Primary Examiner—A. D. Pellinen
Assistant Examiner—Greg Thompson
Attorney, Agent, or Firm—Oblon, Fisher, Spivak, McClelland & Maier

[57] ABSTRACT

A power control apparatus for distributing power to electrical loads. The apparatus contains in a casing a plurality of vertically arranged control units. In the casing, there are provided bus conductors for power source to feed electric power to each of the control units, a vertical control bus device comprising a plurality of control bus conductors each having connecting points for each of the control units, and branch lines which connect each of the connecting points in the control bus conductors with the corresponding control units to form a control circuit for cross-wiring. The construction of the power control apparatus enables easy wiring operations for the control units.

6 Claims, 9 Drawing Figures

CONTROL CENTER WITH VERTICAL CONTROL BUS DEVICE

BACKGROUND OF THE INVENTION

1. Field of the Invention

The present invention relates to a power control apparatus. More particularly, it relates to a power control apparatus for distributing electric power from a power source to each load.

2. Description of Prior Art

A power control apparatus of this kind generally consists of a box-shaped casing in which a plurality of control units are vertically arranged in a multistage and bus conductors for power source are vertically extended. Each of the control units is equipped with at least one line disconnecting device for turning on and off a load circuit to protect it. In the power control apparatus, there is provided a single control circuit being common to the control units, which includes a power circuit, an alarm circuit and so on.

Figure 1:
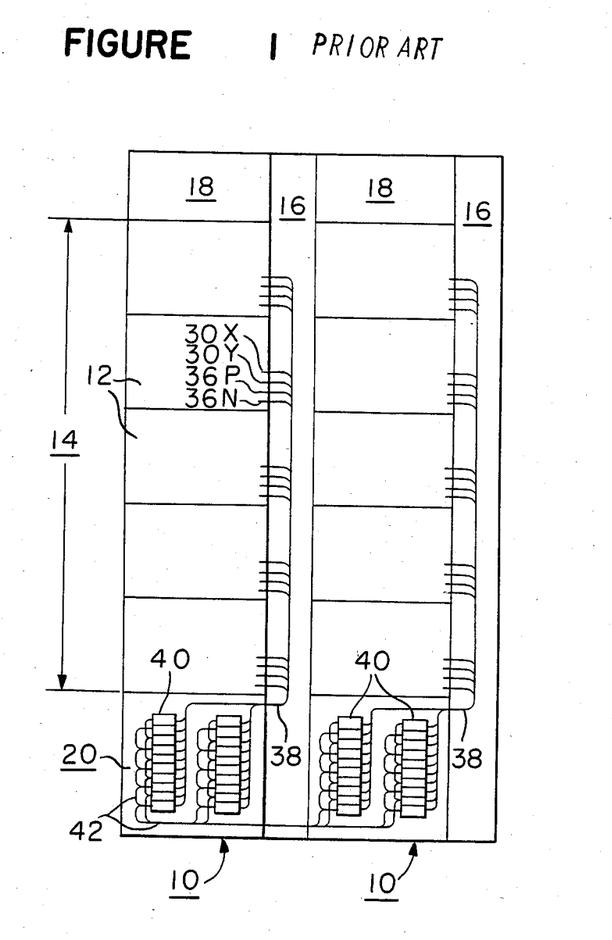
FIG. 1 is a diagram showing wiring arrangement of a conventional power control apparatus.

FIG. 1 is a diagram showing a wiring arrangement of a conventional power control apparatus which is applied to a control center in view from the front side. It is apparent from FIG. 1 that the power control apparatus (control center) 10 of this kind is generally placed side by side in a row.

The power control apparatus 10 is generally constituted by a control unit section 14 in which a plurality of control units 12 are arranged in a multistage, a vertical wiring section 16, a horizontal bus conductor section 18 and a general terminal block section 20. Between terminals 30X and 30Y of a power source for the control circuit being common to the control units 12, a contact for turning off at the tripped position of a thermal relay, an ON push-button, an OFF push-button and a coil of an electromagnetic switch (all not shown) are serially connected in this order through an auxiliary contact actuated in association with on-off operations of a line disconnecting device (not shown). A self-holding contact of the electromagnetic switch is connected in parallel to the ON push-button. In FIG. 1, an external push button and a circuit for a signal lamp are omitted. Between terminals 36P and 36N of an alarm circuit, a contact closing at the tripped position of the line disconnecting device is connected in parallel to a contact closing at the tripped position of the thermal relay even though both devices are not shown in FIG. 1. The terminals 36P and 36N for each of the control units arranged in a multistage in a casing of the control center 10 are connected in parallel and are connected to the alarm circuit as a group. Vertical wirings 38 for the terminals 30X, 30Y, 36P and 36N led out from a terminal block in one of the control units 12 are connected to the general terminal block 40. Cross-wirings 42 are provided to connect between terminals in the same general terminal block and to connect between the general terminal blocks 40 of the control centers 10 adjacent each other.

The conventional power control apparatus applied to a control center 10 has encountered the following drawbacks when wiring operations have been carried out for the control units 12 arranged in a multistage.

(1) A number of wiring steps are needed to take a long time for wiring operations to thereby cause delay in an appointed date of delivery.

(2) A space for the control unit section 14 is limited because of the presence of the general terminal block section 20 for receiving therein the general terminal blocks 40.

(3) When a control unit 12 is to be added or to be removed, it is necessary to add or remove the vertical wirings 38 for the specified control unit. In this case, since the wiring operations is carried out after the assemblage of the apparatus, modification and rectification of the vertical wirings in a limited space are extremely difficult.

(4) External cables for a main circuit and a control circuit are vertically extended in the vertical wiring section 16 in addition to the vertical wiring 38. The vertical wirings are previously arranged in the wiring section at the factory, while the external cables are arranged in the wiring section when the control center is at the installation location.

(5) Since a drawing port for vertical wirings 38 led out from the control units 12 and a pulling-in port for the external cables are formed at the same side in the casing, wiring operations are complicated and it is difficult to maintain good condition for the wiring.

SUMMARY OF THE INVENTION

It is an object of the present invention to provide a power control apparatus in which a vertical control bus conductor device is arranged adjacent to the control units so as to connects vertical control bus conductors to each of the control units with branch lines to thereby eliminate disadvantage of the conventional apparatus.

It is another object of the present invention to provide a power control apparatus in which vertical control bus conductors for common cross-wirings are arranged at a position opposite a pulling-in port for cables of the control units so as to connect the vertical control bus conductors to each of the control units with branch lines to thereby eliminate the disadvantage of the conventional apparatus.

One aspect of the present invention is to provide a power control apparatus comprising vertical bus conductors for a power source arranged in a casing in the vertical direction and a plurality of control units piled on in a multistage in the casing, the power control apparatus being characterized by comprising a vertical control bus device provided with a plurality of vertical control bus conductors arranged in the vertical direction adjacent to the control units, plural connecting points for branching in each of the vertical control bus conductors corresponding to each of the control units and branch lines extending from the connecting points for branching to each of the control units to form a control circuit common to the control units.

Another aspect of the present invention is to provide a power control apparatus comprising a vertical wiring section formed adjacent to one surface side of the control units and vertical control bus condustors provided at the other surface side of the control units so as to be opposed with respect to the control units in a casing.

DETAILED DESCRIPTION OF PREFERRED EMBODIMENT

An embodiment of the present invention will be described with reference to FIGS. 2 to 8 by exemplifying a control center in which a main controlled system is the load of motors.

Figure 2:
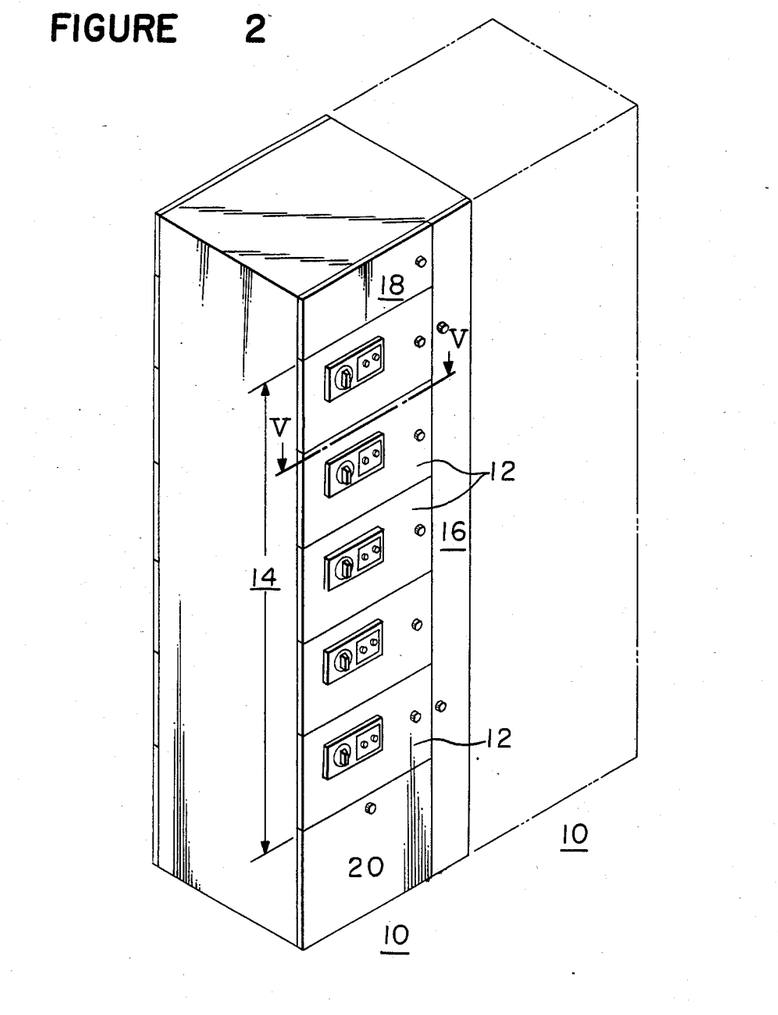
FIG. 2 is a perspective view of an embodiment of the power control apparatus according to the present invention.

As shown in the perspective view of FIG. 2, a plurality of control centers 10 are arranged laterally in a row. Each of the control centers 10 generally comprises a control unit section 14 receiving therein a plurality of control units 12 arranged in a multistage, a vertical wiring section 16, a horizontal bus conductor section 18 and a general terminal block section 20.

Figure 3:
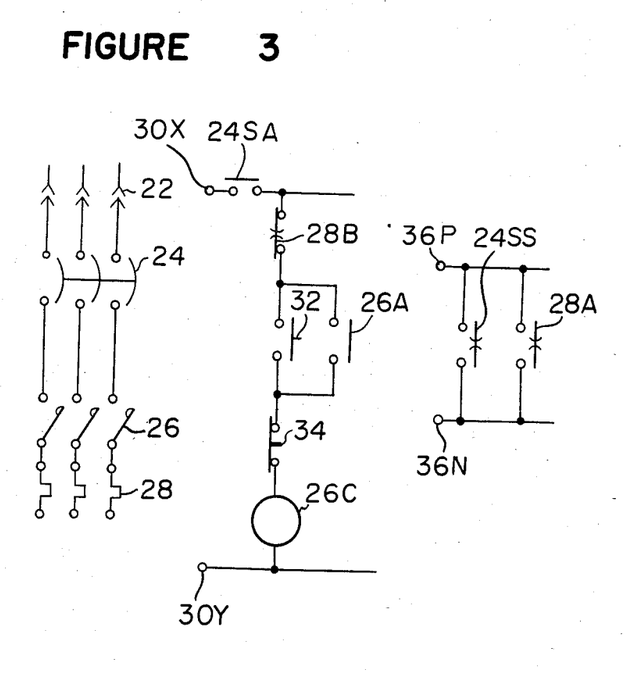
FIG. 3 is a circuit diagram for a control unit received in the power control apparatus.

FIG. 3 shows a circuit diagram for a control unit 12 wherein a plug-in connector 22, a line disconnecting device 24, an electromagnetic switch 26 and a thermal relay 28 are connected in series in this order to form a main circuit.

Between terminals 30X and 30Y of a power source for a control circuit being common to the control units, an OFF contact 28B opened at the tripped position of the thermal relay 28, an ON push button 32, an OFF push-button 34 and a coil 26C of the electromagnetic switch 26 are sequentially connected in this order through an auxiliary contact 24SA actuated in association with opening and closing operations of the line disconnecting device 24. Further, a self-holding contact 26A of the electromagnetic switch 26 is connected in parallel to the ON push-button 32. In FIG. 3, an external push button and a circuit for signal lamp are omitted. Between terminals 36P and 36N of an alarm circuit, a contact 24SS for closing at the tripped position of the line disconnecting device is connected in parallel to a contact 28A for closing at the tripped position of the thermal relay 28. The terminals 36P and 36N for each of the control units arranged in a multistage in the casing of the control center 10 are connected in parallel to be connected to the alarm circuit in a group.

Figure 4:
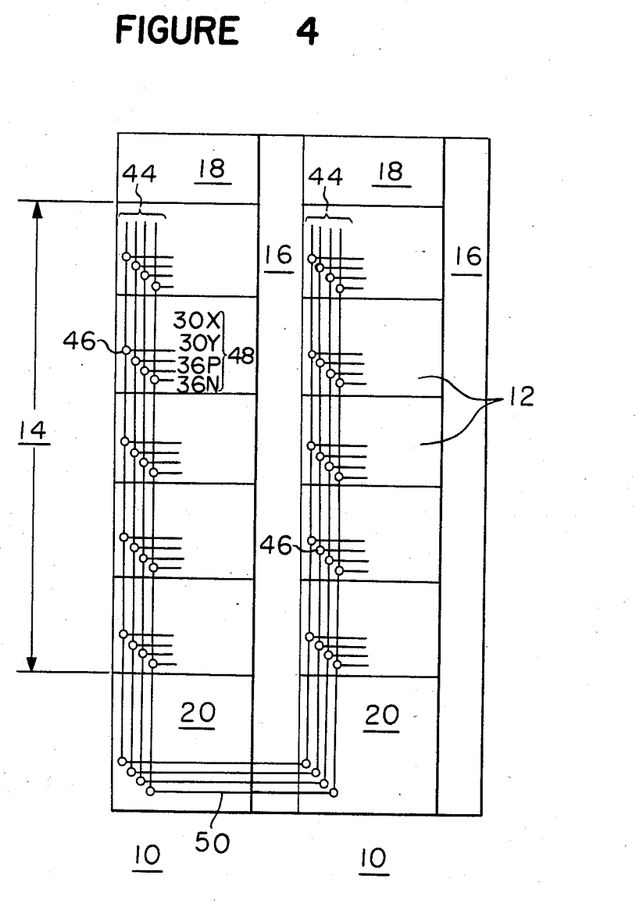
FIG. 4 is a diagram showing wiring arrangement of the power control apparatus of the present invention corresponding to FIG. 3.

FIG. 4 shows an arrangement of cross-wirings for the terminals 30X, 30Y, 36P and 36N shown in FIG. 3. FIG. 4 also shows an arrangement of wiring for each of the control units 12 of the control center 10 in which the same reference numerals as in FIG. 3 designate the same or corresponding parts. A plurality of connecting points are provided in each of vertical control bus conductors of a vertical bus device 44 arranged along the control unit section 14, the connecting points corresponding to each of the control units 12 and each of branch lines 48 extending from each of the connecting points 46 to each of the control units 12. In this embodiment, four branch lines 48 are provided, that is, for terminals 30X, 30Y, 36P and 36N. The vertical control bus device 44 of one control center 10 are connected to that 44 of an adjacent control center 10 with cross-wirings 50.

Figure 5:
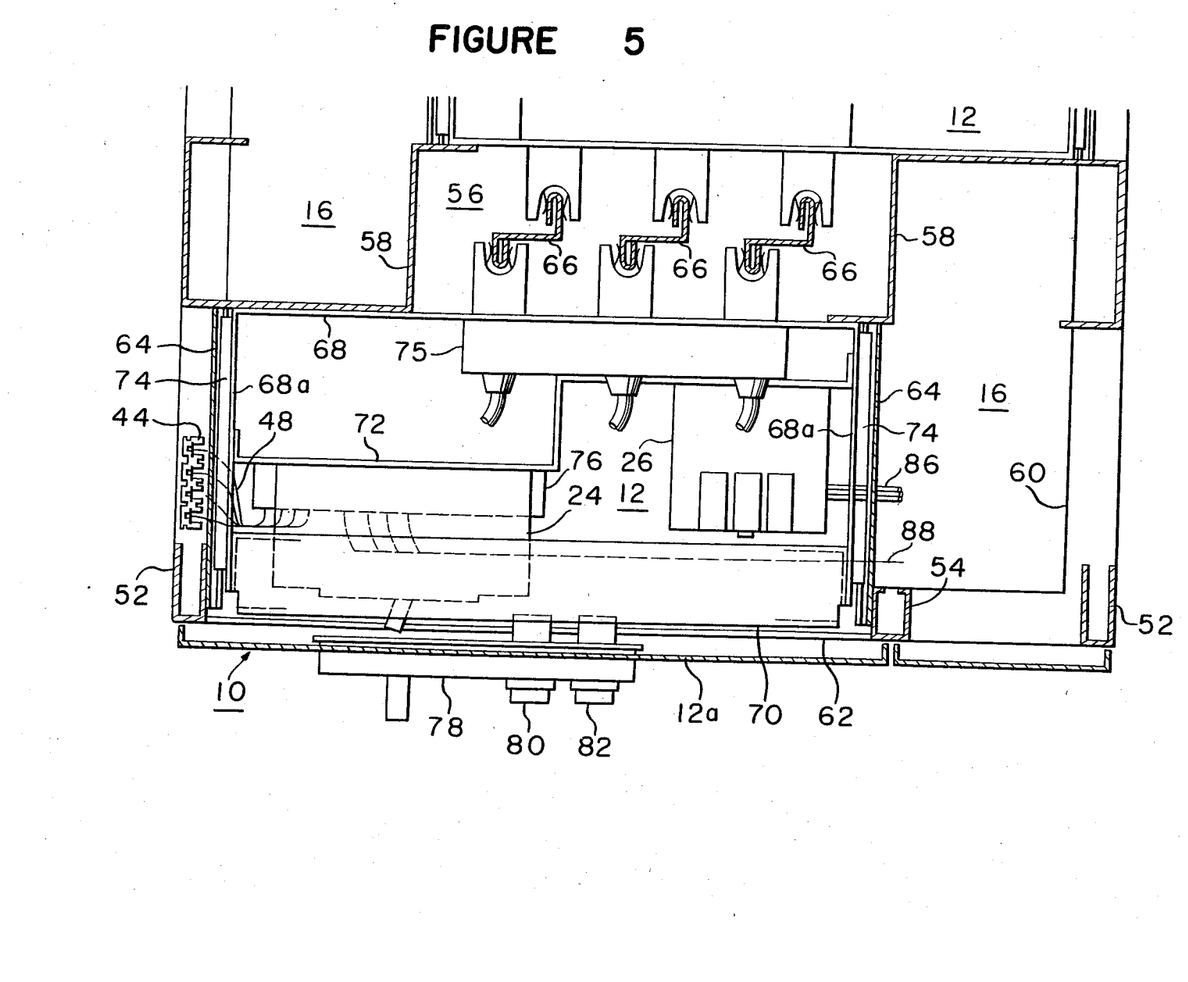
FIG. 5 is a cross sectional view taken along the line V—V in FIG. 2.
Figure 6:
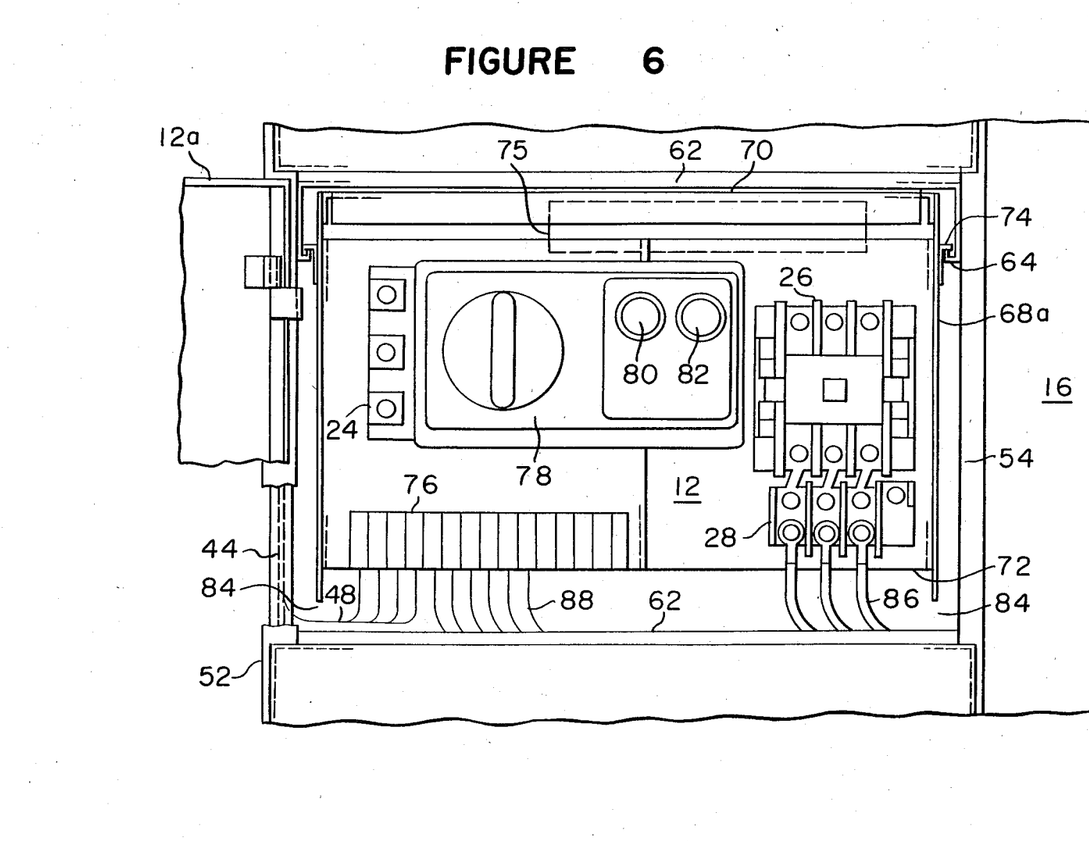
FIG. 6 is an enlarged front view showing one of the control units shown in FIG. 5 with its door opened.

FIG. 5 is a cross sectional view showing a specified embodiment of the control center 10 and FIG. 6 is a front view showing one of the control units 12 with its door opened which are arranged in a multistage in the control center 10. In FIGS. 5 and 6, corner supports 52 are set up at four corners of the control center 10 and an intermediate support 54 is set up at the intermediate portion between the control unit section 14 and the vertical wiring section 16. The vertical wiring section 16 is separated from a vertical bus conductor section 56 by means of a vertical supporting frame 58. The upper and lower ends of all the supports 52 and 54 and the vertical supporting frame 58 are respectively connected with horizontal frames 60. Guide rails 64 are formed at both ends of a partition plate 62 which defines a space for the control units 12 in the vertical direction. Three vertical bus conductors 66 (for three phases) for power source each having a substantially Z shape in cross section are secured in the vertical supporting frame 58 by an insualting supporting device though it is not shown in the drawing.

In the next place, description will be made as to a construction of a typical control unit 12. The reference numeral 68 designates a unit case having a substantially inverted U-shape in a plane view as shown in FIG. 5, the numeral 70 refers to a front crossing member serving as a drawing knob, on which a latch device (not shown) may be placed. The numeral 72 designates a fitting plate which divides the interior of the unit case into the front and rear portions and the numeral 74 designate fitting rails provided on the outer surface of both side plates 68a of the unit case. A connector 75 to be connected to the vertical bus conductors 66 is positioned at the rear of the fitting plate 72. On the front surface of the fitting plate 72, the line disconnecting device 24, the electromagnetic switch 26, the thermal relay 28 as described before and a terminal block 76 are attached. On a door 12a of the control unit 12, there are attached an operating handle device 78 for operating the line disconnecting device 24 from the outside and push buttons 80/82. Further cables 86 for the main circuit extend from the vertical wiring section 16 through a gap or port 84 formed between the side plates 68a of the unit case and the partition plate 62 and are connected to the thermal relay 28. Likewise, cables 88 for the control circuit extend and are connected to the terminal block 76. The vertical control bus device 44 is arranged at a position opposite the outgoing side for the cables 86 and 88, namely at the left side of the control unit 12 in FIGS. 5 and 6 and branch lines 48 extend from the vertical control bus device 44 to the terminal block 76 through the gap 84 formed between the side plates 68a and the partition plate 62. The vertical control bus device 44 is formed thin in its general configuration and is arranged at the rear side of one of the corner supports 52.

Figure 7:
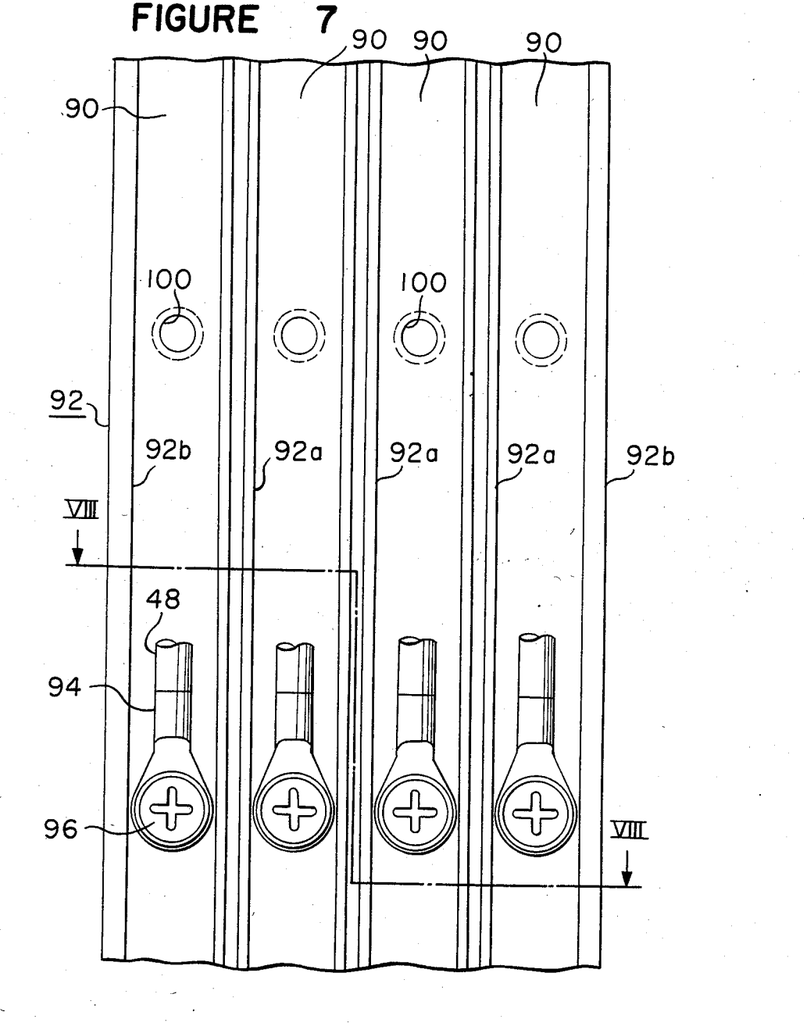
FIG. 7 is an enlarged front view showing an embodiment of a vertical control bus conductor device used for the power control apparatus according to the present invention.

FIG. 7 is a front view showing one embodiment of the vertical control bus device 44 as described above and FIG. 8 is a cross sectional view taken along the line VIII—VIII in FIG. 7. The vertical control bus device 44 comprises a plurality of electrically conducting bars 90 in a rectangular shape in cross section and insulating case 92 holding a plurality of conducting bars in laterally aligned condition.

In each of the conducting bars, threaded holes 100 for set screws which serve as connecting points as above-mentioned are formed at a predetermined interval and each of the branch lines 48 with it one end fitted with a circular crimp-type terminal 94 is secured to each of the conducting bars by means of a screw 96 fitted into the threaded hole 100 for set screw.

Figure 8:
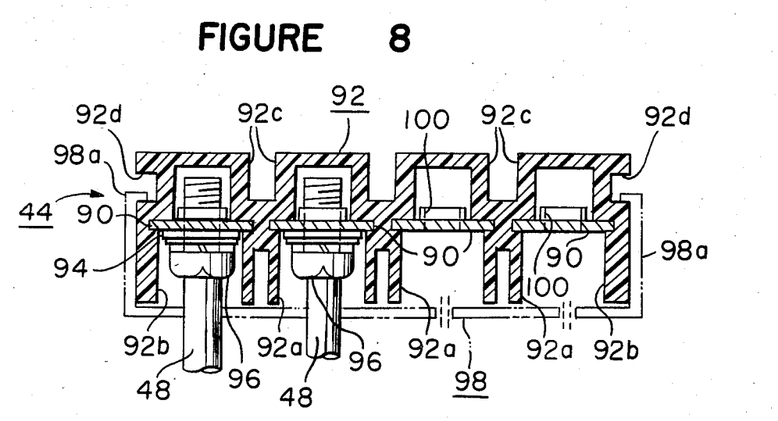
FIG. 8 is a cross sectional view taken along the line VIII—VIII in FIG. 7.

The insulating case 92 is provided integrally with a plurality of insulating barriers 92a in the intermediate portion and a pair of end insulating barriers 92b at its both sides in which the intermediate insulating barriers 92a extend from the vicinity of the conducting bars 90 disposed in lateral alignment in the insulating case 92. A plurality of base portions 92c having a cross section as shown in FIG. 8 are formed integrally with these insulating barriers 92a, 92b in the insulating case 92. Both edges in the width direction of each of the conducting bars 90 are fitted in inner portions of the barriers 92a, 92b to be secured to the insulating case 92. Fitting grooves to which the conducting bars are fitted are formed at the same time of extrusion-molding of the insulating case 92. In the both side surfaces of the insulating case 92 in its longitudinal direction, side grooves 92d are respectively formed. A cover 98 is provided on the insulating barriers, if necessary, to minimize an exposed charging part of the vertical control bus device 44. The cover 98 is provided with legs 98a at both sides and the legs are engaged with the side grooves 92d in a detachable manner.

As described above, the embodiment of the present invention provides the following effects by arranging the vertical control bus device in the vicinity of the control units and connecting the vertical control bus conductors and each of the control units with branch lines.

(A) Elimination of the vertical wirings 38 and the cross-wirings 42 as required in the conventional apparatus remarkably reduces wiring operations.

(B) The length of wirings used for the coventional wirings 38, 42 is variable depending on situations whereas the length of the branch lines 48 of the present invention is constant to thereby allow easy fabrication. Further, a time for manufacturing the power control device can be reduced to shorter an appointed date of delivery because the branch lines can be previously prepared as well as the vertical control bus device.

(C) The general terminal block section 20 can be small because the general terminal block 40 used for the conventional apparatus is unnecessary and a space for the control unit section 14 can be increased for the amount of the reduced area to thereby increase a space for the control units 12.

(D) When a control unit or units are to be added or removed, only the branch lines 48 are changed and accordingly, it is easily perform the change of wiring without adversely affecting the wiring for the other control units.

(E) Since the vertical control bus device is arranged at a position opposite the pulling-in port of cables for the control units to thereby allow arrangement of common cross-wiring for each of the control units and further, the vertical control bus conductors are connected to each of the control units with the branch lines, the vertical wirings 38 used for a common control circuit in the vertical wiring section 16 are unnecessary and arrangement of the external cables 86, 88 in the vertical direction and fastening operations for the cables can be easily performed.

(F) Since the vertical control bus device 44 is arranged at a position opposite the pulling-in port for the external cables for the control units and further, the pulling-in port for the branch lines 48 connected to the control units and the pulling-in port for the external cables are separated at left and right sides, wiring arrangement can be regular and maintenance of the wirings is easy.

(G) The vertical control bus device 44 is arranged at the rear side of one of the corner supports 52, namely at a position that has not originally utilized, an additional space is not required and the addition and removal of a control unit can be conducted without any trouble.

In the embodiment as described above, description has been made as to a control center to which the present invention is applied. It is, however, possible to obtain the same effect even when the control unit or units are used for a stationary type centralized control panel, a self-standing distribution panel, a wall type distribution panel and so on. In this case, the vertical control bus device can be arranged at a desired position along a wall surface of the panel.

Further, the vertical control bus device 44 is not limited to the construction as shown in FIGS. 7 and 8, but can be made so that the branch lines are connected by means of a well known snap-on terminals to obtain the same effect.

Figure 9:
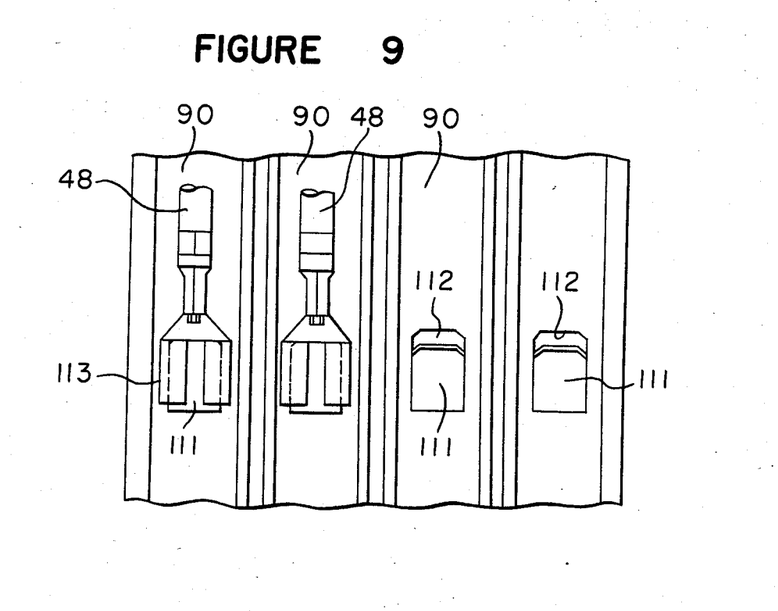
FIG. 9 is an enlarged front view showing modification of the vertical control bus conductor device shown in FIG. 7.

FIG. 9 shows an example using such snap-on terminals in which each tab 111 is formed each of the conducting bars 90 by cutting and raising it so as to be used for a snap-on terminal 113. The reference numeral 112 designates an opening formed in the conducting bar 90 by cutting and raising it. The snap-on terminal 113 is fitted and secured at the end of the branch line 48. Although only two branch lines 48 are shown in FIG. 9, four branch lines 48 are respectively connected to the tabs 110.

What is claimed is:

1. A control center with a vertical control bus device for distributing electric power from a power source to power consuming devices, comprising:

a casing containing therein a plurality of control units arranged in a tier, said casing further containing a vertical bus conductor section in its inner portion in which a plurality of vertical bus conductors are extended;

a vertical wiring section disposed beside said control units, said vertical wiring section being provided with external cables outgoing from said control units;

a control bus device for a control circuit which is used common to said control units, and which is arranged at a position opposite said vertical wiring section with respect to said control units, said control bus device including a plurality of conducting bars extending in the vertical direction being adjacent to said control units and having connecting points connecting branch lines to each of said control units, said branch lines being connected from each of said connecting points to each of said control units to form a control circuit for cross-wiring said control units.

2. The control center according to claim 1, wherein said control bus device is arranged at a position opposite an outgoing port for said external cables connected to said control units and said branch lines are connected from said conducting bars to said control units from the direction opposite the direction from which said external cables are pulled in.

3. The control center according to claim 1, wherein a support is placed at the front surface of said casing and said control bus device is arranged at the rear side of said support.

4. The control center according to claim 1, wherein said control bus device comprises a plurality of conducting bars each having connecting points connecting said branch lines located at a predetermined interval and an electrically insulative case having a plurality of grooves for respectively receiving said conducting bars, each of said conducting bars being attached to walls on both sides of each of said grooves.

5. The control center according to claim 1, wherein said control bus device comprises a plurality of conducting bars each having connecting points connecting said branch lines located at a predetermined interval, an electrically insulative case having a plurality of grooves respectively receiving said conducting bars and having an opened surface and a cover detachably connected to said case to cover said open surface of said case.

6. The control center according to claim 4, wherein a pair of engaging grooves are formed in both side surfaces of said casing and a pair of legs are formed at both ends of said cover to be detachably connected to said grooves.

* * * * *